(12) United States Patent
Seo et al.

(10) Patent No.: US 7,711,759 B2
(45) Date of Patent: May 4, 2010

(54) RECORDING MEDIUM, METHOD OF CONTROLLING FILE OF THE RECORDING MEDIUM, AND METHOD AND APPARATUS FOR REPRODUCING THE SAME

(75) Inventors: Kang Soo Seo, Anyang-si (KR); Byung Jin Kim, Seongnam-si (KR); Jea Yong Yoo, Seoul (KR)

(73) Assignee: LG Electronics, Inc., Seoul (KR)

( * ) Notice: Subject to any disclaimer, the term of this patent is extended or adjusted under 35 U.S.C. 154(b) by 570 days.

(21) Appl. No.: 11/001,178

(22) Filed: Dec. 2, 2004

(65) Prior Publication Data
US 2005/0131858 A1 Jun. 16, 2005

(30) Foreign Application Priority Data
Dec. 3, 2003 (KR) .................. 10-2003-0087309

(51) Int. Cl.
*G06F 17/30* (2006.01)
(52) U.S. Cl. ....................... 707/822; 707/823
(58) Field of Classification Search .............. 707/1, 707/10, 101; 700/94; 386/95, 96; 381/61
See application file for complete search history.

(56) References Cited

U.S. PATENT DOCUMENTS 6,405,201 B1 6/2002 Nazari

2001/0051955 A1* 12/2001 Wong .................. 707/201
2002/0002413 A1* 1/2002 Tokue .................. 700/94
2004/0223726 A1* 11/2004 Lee .................. 386/46
2005/0002525 A1* 1/2005 Alkove et al. .......... 380/37

OTHER PUBLICATIONS

International Search Report issued Jul. 15, 2005 in corresponding International Patent Application No. PCT/KR2004/003145.

* cited by examiner

*Primary Examiner*—Charles Rones
*Assistant Examiner*—Fariborz Khoshnoodi
(74) *Attorney, Agent, or Firm*—Harness, Dickey & Pierce, P.L.C.

(57) ABSTRACT

A recording medium, a method of controlling a file of the recording medium, and a method and apparatus for reproducing the same are disclosed. The recording medium includes at least one data area storing an original file system, which includes original data files, at least one normal file designating at least one of the original data files, and at least one remote file designating at least one additional data file, the at least one additional data file being required to be downloaded from an external source in order to play-back the at least one remote file.

15 Claims, 16 Drawing Sheets

FIG. 4B

| File Name | File Type | Attribute (disc_existence) |
|---|---|---|
| Root | directory | 1 |
| BDMV | directory | 1 |
| index | file | 1 |
| MovieObject | file | 1 |
| PLAYLIST | directory | 1 |
| 11111 | file | 1 |
| 22222 | file | 1 |
| 33333 | file | 0 |
| CLIPINF | directory | 1 |
| 01000 | file | 1 |
| 02000 | file | 0 |
| 03000 | file | 0 |
| STREAM | directory | 1 |
| 01000 | file | 1 |
| 02000 | file | 0 |
| 03000 | file | 0 |

"Remote file"
−Download list

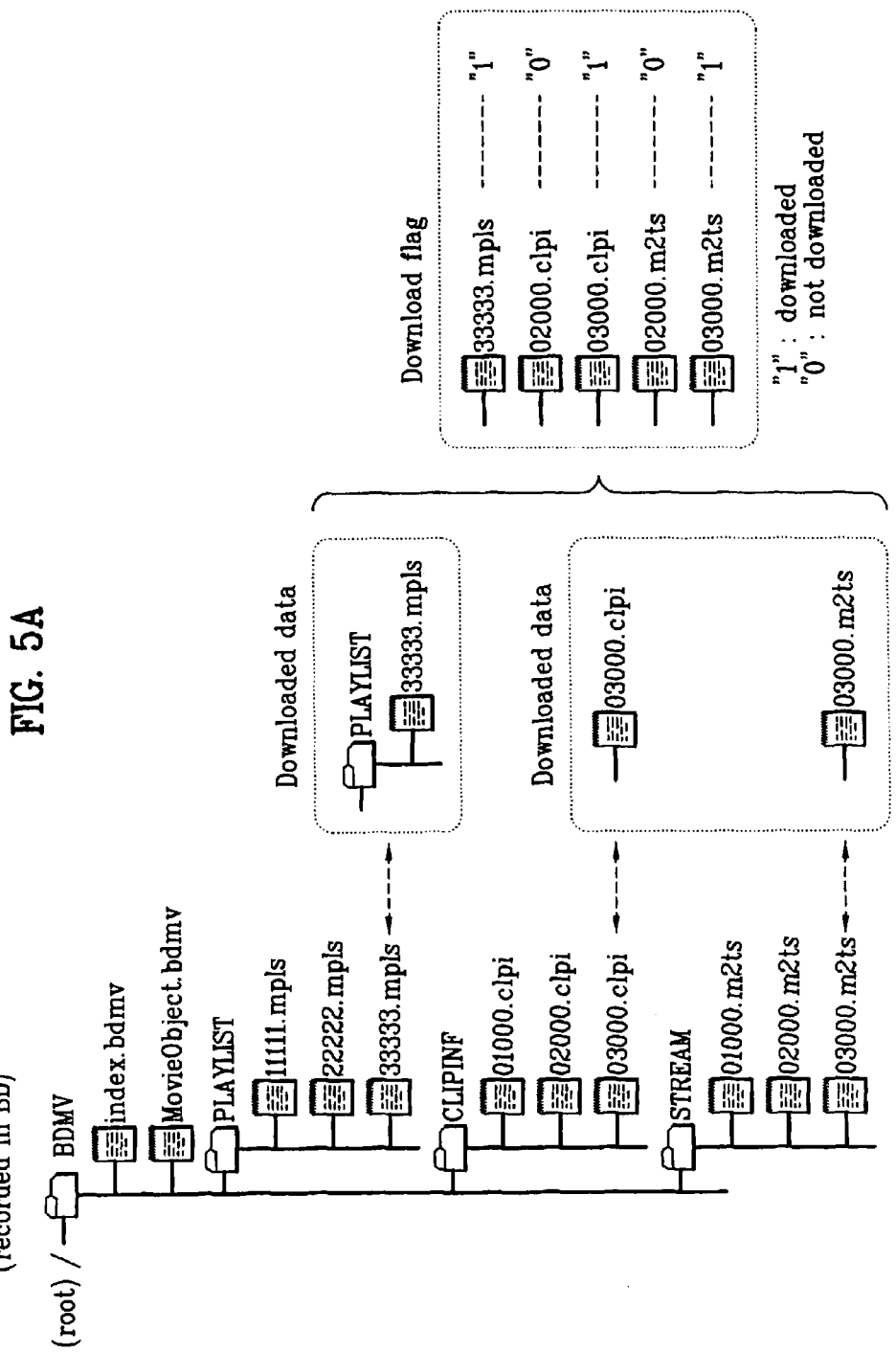

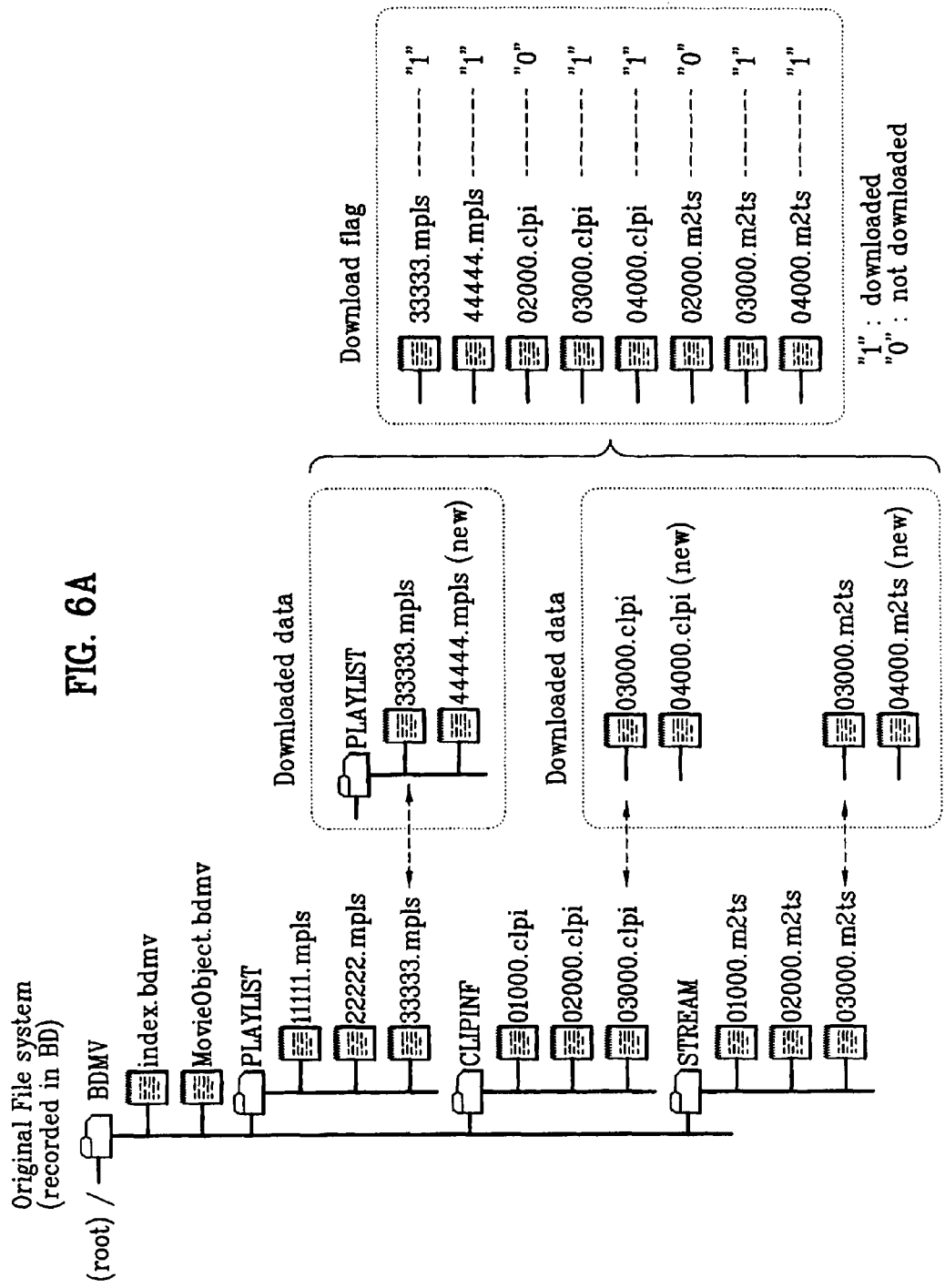

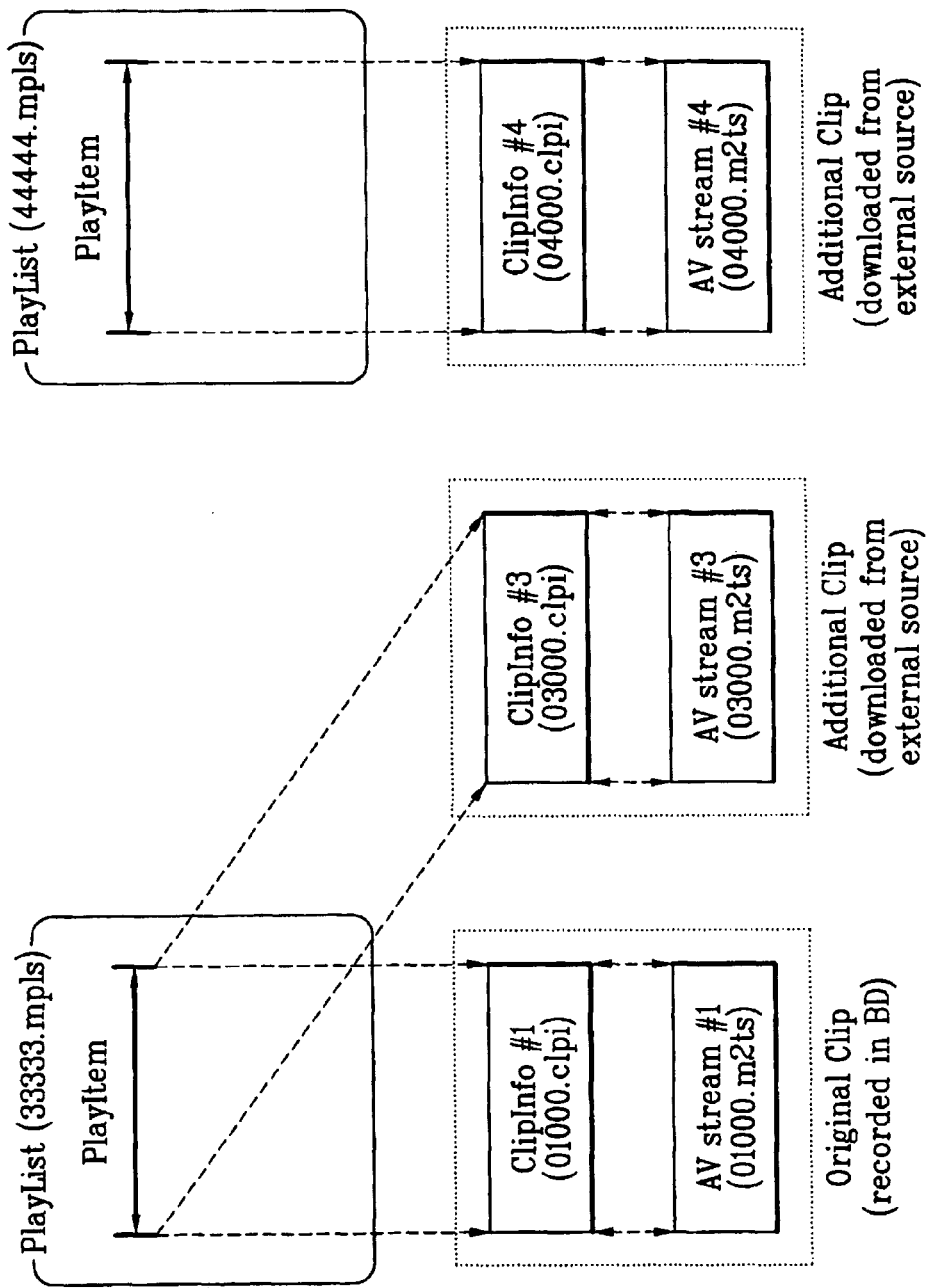

RECORDING MEDIUM, METHOD OF CONTROLLING FILE OF THE RECORDING MEDIUM, AND METHOD AND APPARATUS FOR REPRODUCING THE SAME

This application claims the benefit of the Korean Patent Application No. 10-2003-0087309, filed on Dec. 3, 2003, which is hereby incorporated by reference as if fully set forth herein.

BACKGROUND OF THE INVENTION

1. Field of the Invention

The present invention relates to a recording medium, and more particularly, to a recording medium, a method of controlling a file of the recording medium, and a method and apparatus for reproducing the same. Although the present invention is suitable for a wide scope of applications, it is particularly suitable for creating a virtual file system that enables data being recorded on the recording medium and data downloaded from an external source to be put to combined use, and for playing-back the playback control file.

2. Discussion of the Related Art

Optical discs are widely used as a recording medium for recording mass data. Presently, among a wide range of optical discs, a new high density optical recording medium, such as a blu-ray disc (hereinafter referred to as "BD"), is under development for recording (or writing) and storing high definition video and audio data for a long period of time. Currently, the blu-ray disc (BD), which is known to be the next generation recording medium technology, is under development as a next generation optical recording solution that is capable of having data significantly surpassing the conventional DVD, along with many other digital apparatuses.

Most particularly, in the above-described optical recording and/or reproducing apparatus, the basic function(s) of recording and/or reproducing the blu-ray disc (BD), as well as additional functions taking into account a combined usage with related peripheral digital apparatuses are/is being considered. Thus, generally, the optical recording and/or reproducing apparatus must be provided with functions of either receiving external input signals and displaying the received signals, or applying external input signals with a built-in blu-ray disc (BD) playback signal for reproduction.

However, since preferable playback (or reproducing) methods for reproducing a combination of the external input signal and the built-in blu-ray disc (BD) playback signal are not yet known and familiarized, there are many restrictions in the full-scale development of a blu-ray disc (BD)-based optical recording and/or reproducing apparatus. And, such restrictions cause problems in the field of reproducing the external input signal and the built-in blu-ray disc (BD) playback signal as one single reproducing unit.

SUMMARY OF THE INVENTION

Accordingly, the present invention is directed to a recording medium, a method of controlling a file of the recording medium, and a method and apparatus for reproducing the same that substantially obviate one or more problems due to limitations and disadvantages of the related art.

An object of the present invention is to provide a method and apparatus for reproducing data using the playback control file that are suitable for a recording medium, such as a blu-ray disc (BD).

Another object of the present invention is to provide a method of creating a file within an optical disc or in an external source, wherein the file can reproduce data recorded within the optical disc as well as data downloaded from the external source, and to provide a systematic method of controlling the created file as standardized information.

A further object of the present invention is to provide an effective method and apparatus for reproducing a recording medium using the created file.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording medium includes at least one data area storing an original file system, which includes original data files, at least one normal file designating at least one of the original data files, and at least one remote file designating at least one additional data file, the at least one additional data file being required to be downloaded from an external source in order to play-back the at least one remote file.

In another aspect of the present invention, a method of reproducing data recorded on a recording medium reading an original file system recorded on the recording medium, the original file system including original data files, at least one normal file designating at least one of the original data files, and a plurality of remote files designating a plurality of additional data files downloadable from an external source, downloading at least one of the plurality of additional data files from the external source, and creating download status information indicating whether each of the plurality of additional data files has been downloaded from the external source.

In another aspect of the present invention, a method of creating a virtual file system for a recording medium reading an original file system recorded on the recording medium, the original file system comprising original data files and at least one normal file designating at least one of the original data files, downloading at least one additional data file from an external source, and creating a virtual file system based on the original file system and file information of the at least one additional data file.

In another aspect of the present invention, a method of creating a virtual file system for a recording medium reading an original file system recorded on the recording medium, the original file system comprising original data files and at least one normal file designating at least one of the original data files, downloading at least one additional data file from an external source, creating a download file system based on file information of the at least one additional data file, and creating a virtual file system based on the download file system and the original file system.

In another aspect of the present invention, a method of reproducing data recorded on a recording medium includes reading an original file system recorded on the recording medium, the original file system including original data files and at least one normal file designating at least one of the original data files, downloading at least one additional data file from an external source, creating a virtual file system based on the original file system and file information of the at least one additional data file, and reproducing the original data files and the at least one additional data file individually or in combination using the virtual file system.

In another aspect of the present invention, a method of reproducing data recorded on a recording medium includes reading an original file system recorded on the recording medium, the original file system including original data files and at least one normal file designating at least one of the original data files, downloading at least one additional data file from an external source, creating a download file system based on file information of the at least one additional data file, creating a virtual file system based on the download file system and the original file system, and reproducing the original data files and the at least one additional data file individually or in combination using the virtual file system.

In another aspect of the present invention, an apparatus of reproducing data recorded on a recording medium includes a microcomputer configured to read an original file system recorded on the recording medium, the original file system including original data files and at least one normal file designating at least one of the original data files, a local data storage configured to store at least one additional data file downloaded from an external source, and a controller configured to create a virtual file system based on the original file system and file information of the at least one additional data file, wherein the original data files and the at least one additional data file are able to be reproduced individually or in combination using the virtual file system.

In a further aspect of the present invention, an apparatus of reproducing data recorded on a recording medium a microcomputer configured to read an original file system recorded on the recording medium, the original file system including original data files and at least one normal file designating at least one of the original data files, a local data storage configured to store at least one additional data file downloaded from an external source, and a controller configured to create a download file system based on file information of the at least one additional data file, and to further create a virtual file system based on the original file system and the download file system, wherein the original data files and the at least one additional data file are able to be reproduced individually or in combination using the virtual file system.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIGS. 4A and 4B illustrate an example of an original file system including both a normal file and a remote file;

FIGS. 5A and 5B illustrate a method of controlling and playing-back a file according to a first embodiment of the present invention;

FIGS. 6A to 6C illustrate a method of controlling and playing-back a file according to a second embodiment of the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In this detailed description, "recording medium" refers to all types of medium that can record data and broadly includes all types of medium regardless of the recording method, such as an optical disc, a magnetic tape, and so on. Hereinafter, for simplicity of the description of the present invention, the optical disc and, more specifically, the "blu-ray disc (BD)" will be given as an example of the recording medium proposed herein. However, it will be apparent that the spirit or scope of the present invention may be equally applied to other types of recording medium.

Figure 1:
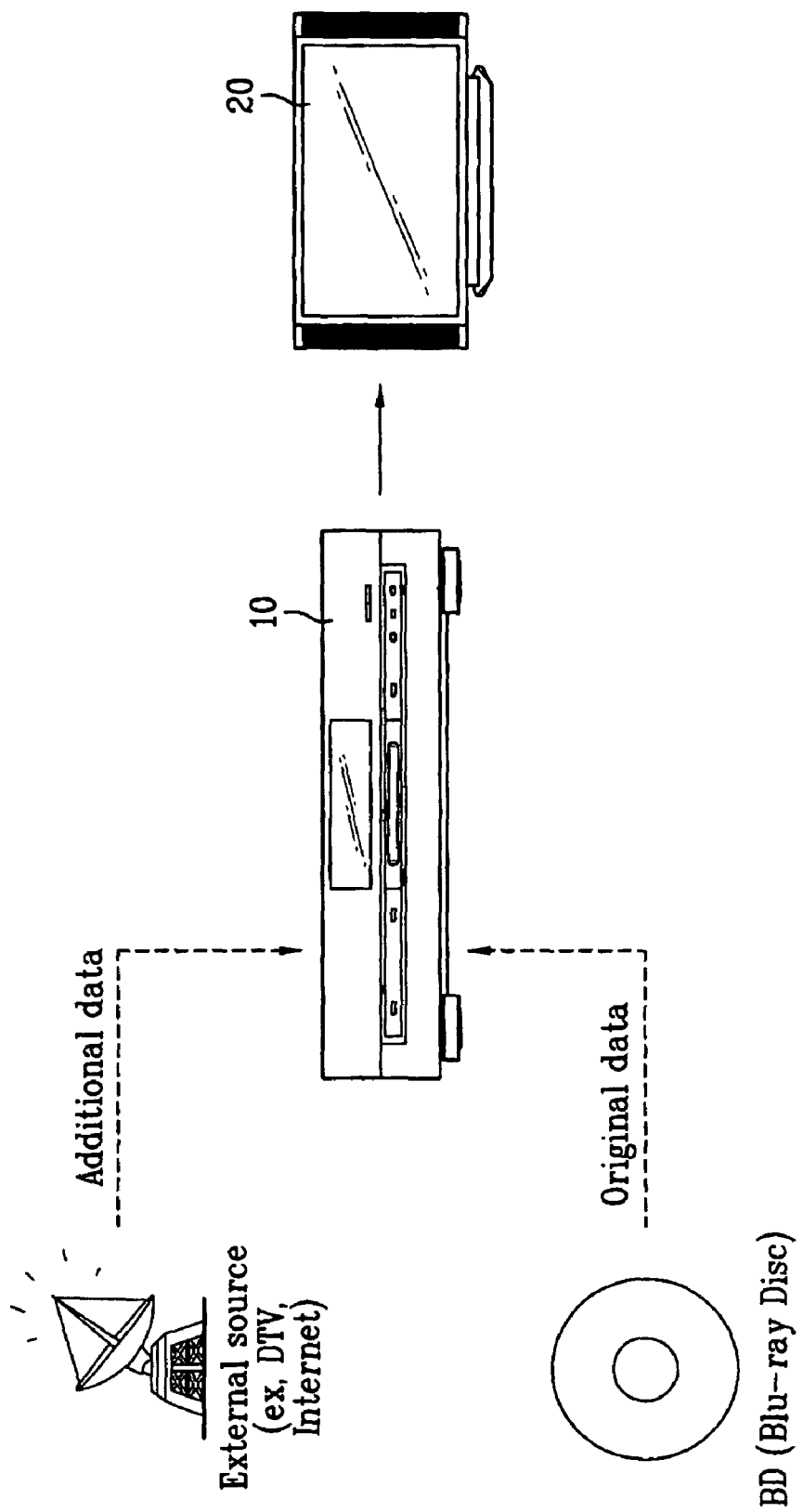
FIG. 1 illustrates a general view of the present invention.

FIG. 1 illustrates a general view of the present invention, which shows an example of a combined usage between an optical recording and/or reproducing apparatus 10 and peripheral apparatuses. The optical recording and/or reproducing apparatus 10 according to the present invention is an apparatus for recording and/or reproducing optical discs of various standards (or sizes). The optical recording and/or reproducing apparatus 10 may be designed to record and/or reproduce optical disc of a specific standard (e.g., a blu-ray disc (BD)). Alternatively, the apparatus may also be designed to only have a reproducing function and no recording function. However, considering the development of the blu-ray disc (BD) and its connection with the peripheral apparatuses, either a BD-Player reproducing the blu-ray disc (BD) or a BD-Recorder recording and/or reproducing the blu-ray disc (BD) will be used as an example in the description of the present invention.

Apart from the function of recording and/or reproducing the disc, the optical recording and/or reproducing apparatus is also provided with a function of receiving an external input signal, processing the received signal, and transmitting the processed signal to a user through another external display 20. In this case, there are no limitations in the external signals that can be inputted, however, digital television (DTV) broadcast programs and the Internet are the most typical types of external signals. Most particularly, since the Internet is presently a medium that can be easily accessed by the public, users can make use of specific data provided on the Internet by downloading such data through the optical recording and/or reproducing apparatus.

Moreover, in the present invention, when original data is recorded on the optical disc (BD), which is loaded in the optical recording and/or reproducing apparatus 10, and additional data, which is downloadable from an external source, is associated with the original data or exists independently in the external source, the original data and the additional data may either be reproduced in combination, or independently (i.e., by itself). More specifically, for example, when a video stream and an audio stream (both in Korean) for a film dubbed in Korean are recorded as the original data on the optical disc, and when an audio stream (in English) for the original film in English exists on the Internet as the additional data, a user may either download the audio stream (in English), which is the additional data existing on the Internet, and reproduce the downloaded audio stream (in English) along with the video stream within the original data, or reproduce the downloaded additional data by itself. In order to meet with the demands of the user, a definition of the relation between the original data and the additional data is necessary, and a systematic method for controlling and reproducing such data as desired by the user is also required.

As aforementioned, the signal recorded within the disc is referred to as the original data and the signal existing in the external source is referred to as the additional data, for simplicity. However, such terms may vary depending upon the method of acquiring the data and are not limited to any specific type of data. Therefore, the additional data generally includes audio data, presentation graphic data, subtitle data, interactive graphic data, and so on. And, without being limited to the above-mentioned examples, it is possible to propose a combination of the original data and the additional data, wherein an audio stream (in English) is the original data and a video stream is the additional data.

Figure 2:
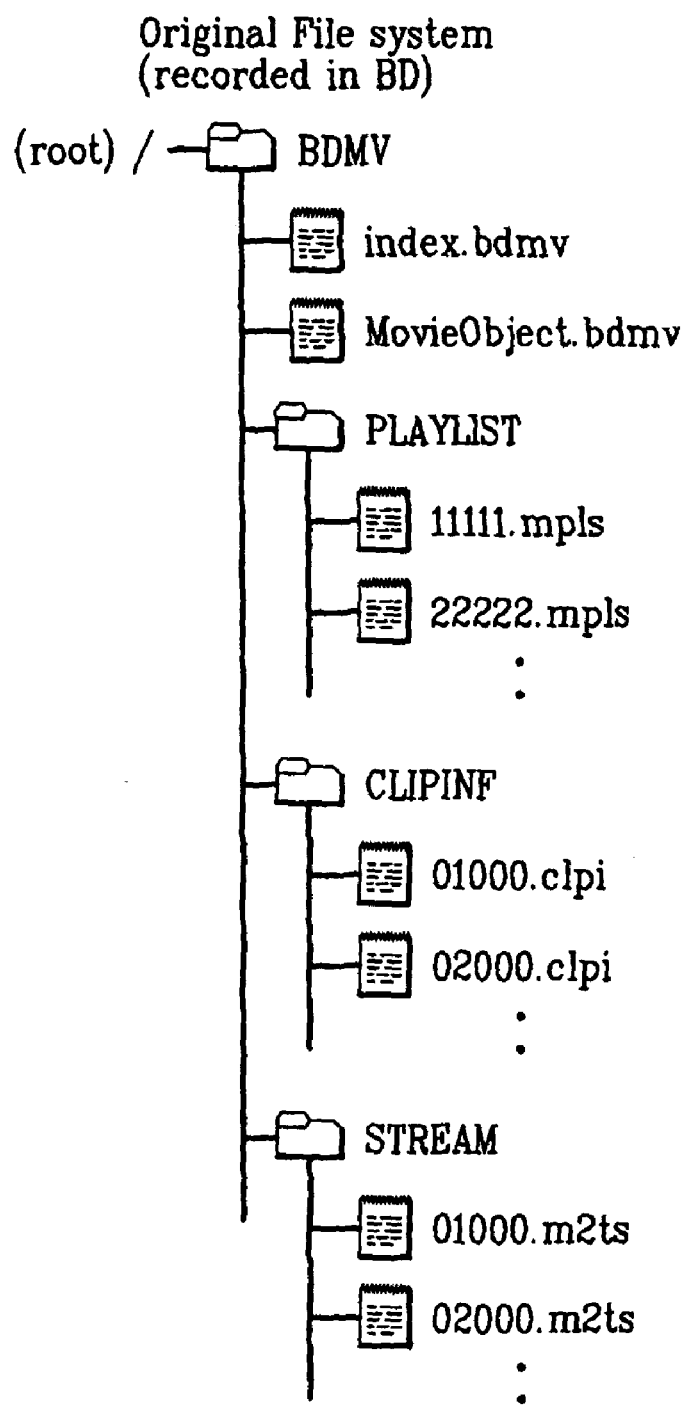
FIG. 2 illustrates a file structure being recorded on an optical disc, the optical disc being a recording medium, according to the present invention.

In order to meet with the demands of the user, a file structure for reproducing both the original data and the additional data, recorded within the optical disc and downloaded from the external source, respectively, must be provided, which will be described in detail with reference to FIGS. 2 and 3. Referring to FIG. 2, which illustrates a file structure for controlling information recorded within the disc, at least one BD directory (BDMV) is included in a root directory (root). Each BD directory includes an "index.bdmv" and a "MovieObject.bdmv", which represent general files that are used when interacting with one or more users. For example, the index file contains data representing an index table which includes diverse information regarding a plurality of selectable menus and titles.

Each BD directory includes three file directories including data to be reproduced, and information required for reproducing the data. The file directories included in each BD directory are a stream directory (STREAM), a playlist directory (PLAYLIST), and a clip information directory (CLIPINF). The stream directory includes audio/video (AV) stream (hereinafter referred to as "AV stream") files. More specifically, the AV streams (01000.m2ts, 02000.m2ts) may generally be in the form of MPEG2 transport packets and be named as "*.m2ts". Further, the clip information directory (CLIPINF) includes clip information files (01000.clpi, 02000.clpi) being in one-to-one correspondence with the AV stream files (clip files) included in the stream directory. A clip information file (*.clpi) includes property information and timing information of a corresponding AV stream (clip file), wherein the timing information includes mapping information that maps presentation time stamp (PTS) with source packet number (SPN) using entry point map.

Each pair of an AV stream (*.m2ts) and its corresponding clip information file (*.clpi), which are in one-to-one correspondence with one another, is designated as a clip. For example, 01000.clpi included in CLIPINF includes the property and timing information of 01000.m2ts included in STREAM, and 01000.clpi and 01000.m2ts form a clip. Hereinafter, the clip corresponding to the original data, which is recorded within the disc, will be referred to as an "original clip", and the clip corresponding to the additional data, which is downloadable from an external source (i.e., outside of the disc), will be referred to as an "additional clip".

Referring back to FIG. 2, the playlist directory (PLAYLIST) includes one or more PlayList files (*.mpls), wherein each PlayList file (*.mpls) includes at least one PlayItem which designates playing interval for a specific original clip. More specifically, a PlayItem includes information designating beginning and ending times (In-Time and Out-Time) for reproduction of a specific original clip, which may be designated by clip_Information_File_name within the PlayItem. Accordingly, a PlayList file (*.mpls) represents a playback unit for playing-back a desired clip by using a combination of one or more PlayItems.

In the present invention, depending upon the reproduction of the original data and the additional data, the above-mentioned files (*.mpls, *.clpi, and *.m2ts) can be broadly categorized into two types. More specifically, a file designating only the original data, which is recorded within the optical disc, and allowing normal access is referred to as a "normal file". And, a file having no file recorded within the optical disc that is to be designated, thereby unable to be accessed, is referred to as a "remote file". The remote file can be used only by downloading the additional data from an external source. And, the additional data that is to be downloaded is controlled by a separate download file, the process of which will be described in detail with reference to FIGS. 4A and 4B.

In addition, the above-described file structure is controlled by a file system within the optical disc. More specifically, information for overall file control, such as attributes of each file, locations of the files recorded within the optical disc, and co-relations between the files, are included in the file system. The recent optical discs generally use a universal disc format (UDF) as the file system. However, the file system is not limited to this structure only, and most particularly, the blu-ray disc uses its unique blu-ray disc file system (BDFS). Accordingly, a file system recorded within the optical disc is referred to as an "original file system". And, a new file system that is created in an external source and used for downloaded additional data only is referred to as a "download file system". And, another new file system created in the external source and controlling both the download file system and the original file system is referred to as a "virtual file system".

Figure 3:
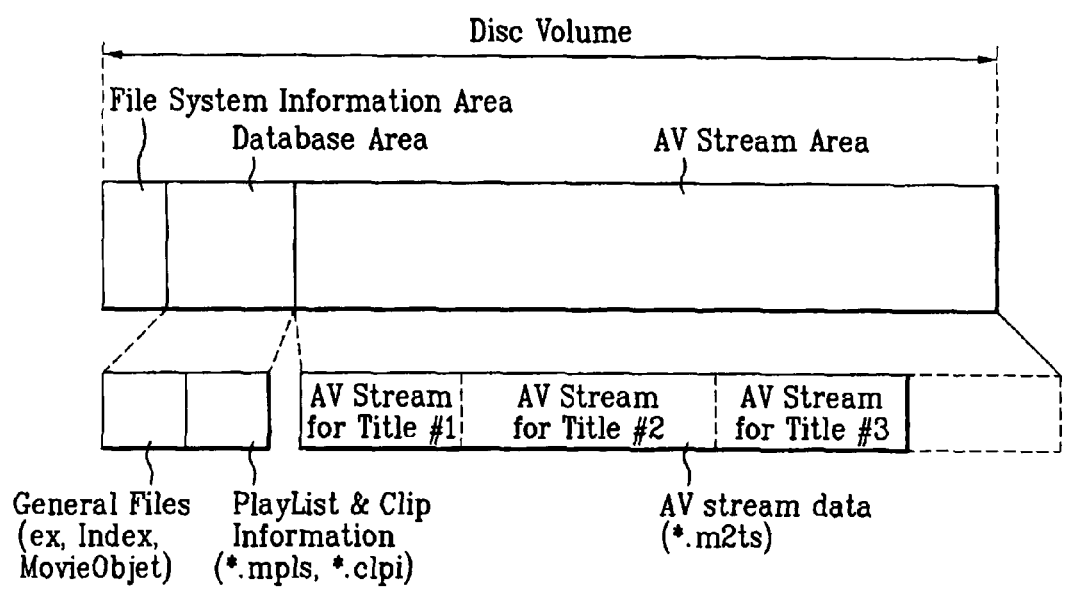
FIG. 3 illustrates a data recording structure being recorded on the optical disc, the optical disc being the recording medium, according to the present invention.

FIG. 3 illustrates a general view of the structure of the information related with the file structure and the file system. Starting from the inner circumference (or center) of the disc, the disc volume includes a file system information area occupying the inmost portion of the disc volume, an AV stream area occupying the outmost portion of the disc volume, and a database area occupied between the file system information area and the stream data area. In the file system information area, system information for controlling the entire data files is recorded. And, original data such as audio/video/graphic data are recorded in the AV stream area.

Most particularly, as described above, the data recorded in the AV stream area within the disc is referred to as an "original clip", and the file system recorded in the file system information area is referred to as an "original file system". Therefore, by using the information within the database area, a user is able to select an AV stream the user desires to reproduce and decide and use the appropriate reproducing method of the selected AV stream. And, the file structure recorded within the optical disc can be verified by the original file system included in the file system information area.

Hereinafter, a file structure for reproducing both of the original data and the additional data, a method of creating a file system for controlling the file structure within an optical disc, and a method of controlling the created file will now be described in detail with reference to the preferred embodiments of the present invention. The proposed embodiments can be largely classified into two types. More specifically, referring to FIG. 4A, a normal file and a remote file may both be included in the original file system. And, referring to FIG. 7A, only a normal file may be included in the original file system.

Figure 4A:
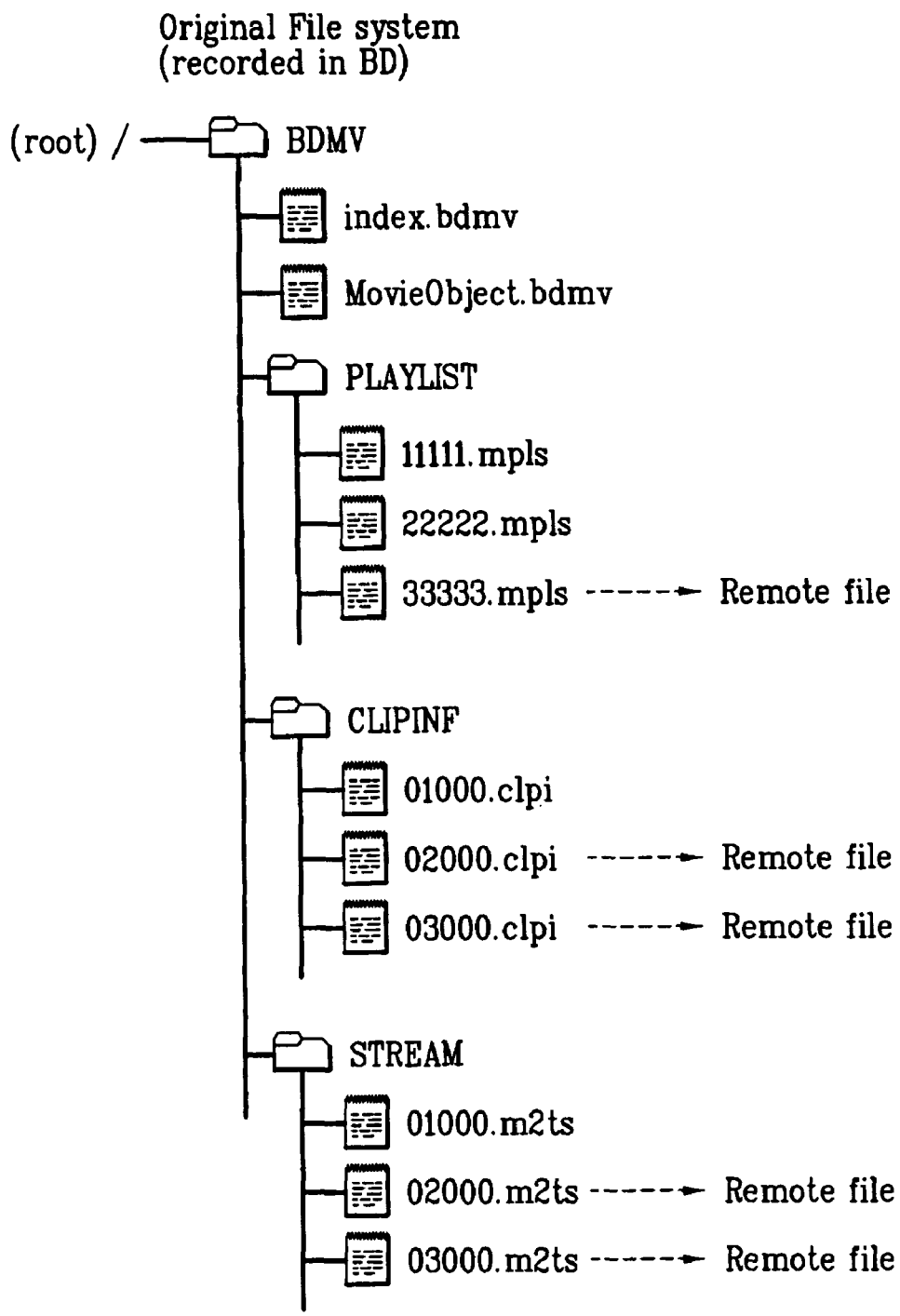

FIGS. 4A and 4B illustrate an example of an original file system including both a normal file and a remote file. More specifically, FIG. 4A illustrates a file structure that is controlled by the original file system. Herein, a normal file having actual data recorded within an optical disc and a remote file having no actual data recorded within the optical disc are both included in the original file system. And, the remote file controls additional data downloadable from an external source. For example, referring to FIG. 4A, a PlayList file 33333.mpls and plurality of clips 02000.clpi, 03000.clpi, 02000.m2ts, and 03000.m2ts correspond to the remote file. The rest of the files correspond to the normal file, in which data exist as normal. Thus, the remote files can be accessed as complete files only after downloading the corresponding additional files.

In the first embodiment of the present invention, as the remote file and the normal file are separately formed on the file system structure, supplementary control information are required. More specifically, each of the remote file and the normal file needs to be distinguished and identified, and information designating the additional data that is to be downloaded to the remote file is also required. Also, identification information identifying download completion of the additional data that is to be downloaded. Such control information can be provided while recording the corresponding control information within the optical disc. However, when using a read-only optical disc (BD-ROM), information cannot be recorded within the optical disc (BD-ROM). And, most particularly, the third control information, which is the identification information indicating the download completion, should be provided and controlled separately in the external source.

FIG. 4B illustrates the first and second control information, which identify the remote file and the normal file, and which designate the additional data to be downloaded. Further, the third control information will be described in a later process with reference to other preferred embodiments (shown in FIGS. 5A and 6A). More specifically, FIG. 4B is an example of a file control table in the file system for controlling the file structure shown in FIG. 4A. The file control table includes categories of "file name", "file type", and "attribute". However, the above-mentioned categories are only part of the categories included in the file control table in the file system. The categories shown in FIG. 4B are used to distinguish and identify the remote files and the normal files according to the present invention.

Therefore, the attribute is used to distinguish and identify the remote file and the normal file, and such information will be referred to as "disc_existence". A file is identified as a normal file, when disc_existence=1. And, a file is identified as a remote file, when disc_existence=0. And, the second control information which designates additional data to be downloaded is also required, and this control information will be referred to as a "download list".

The download list, which is information designating in advance the additional data that is to be downloaded, may be formed either by using the same file name as the additional data that is to be downloaded, or by using uniform resource locator (URL) information of the additional data located on the Internet. The advantage of the download list being formed by using the file name is that the additional data having the same file name can be easily downloaded from any location. Alternatively, forming the downloaded file by using the URL information is more advantageous in that the additional data can only be downloaded from the specific URL, thereby providing more reliable additional data. In addition, the download list may be recorded in each remote file, or a download list used for the entire optical disc may be included in a separate file. In other words, the download list for a specific remote file may be included either in the corresponding remote file or in a separate download list file.

Figure 5B:
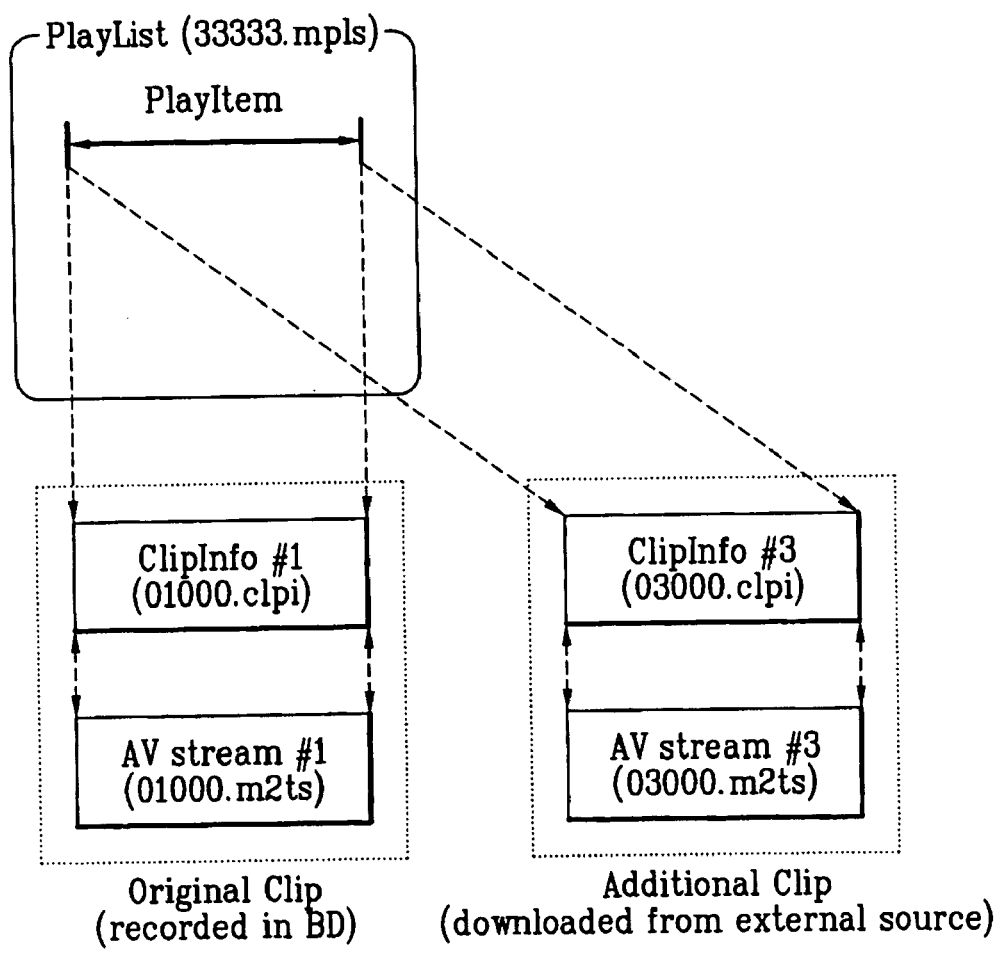

FIGS. 5A and 5B illustrate a method of controlling and playing-back a file according to a first embodiment of the present invention. More specifically, FIGS. 5A and 5B illustrate a method of controlling a file when an optical disc including an original file system, as shown in FIG. 4A, is loaded in an optical recording and/or reproducing apparatus 10. In addition, in the first embodiment of the present invention, only the remote file included in the original file system and the additional data designated by the download list can be downloaded.

Accordingly, FIG. 5A illustrates an overall file control method, and FIG. 5B illustrates a method of reproducing an optical disc by using the overall file control method. When the optical disc is loaded in the optical recording and/or reproducing apparatus 10, a file structure is identified from the file system information. Then, remote files and normal files are distinguished and identified, and in case of the remote files, a download list is verified. Subsequently, additional data is/are downloaded in accordance with a user demand or a system command. FIG. 5A illustrates an example in which, among the remote files, 33333.mpls, 03000.clpi, and 03000.m2ts are completely downloaded, and 02000.clpi and 02000.m2ts are not yet downloaded.

Therefore, by using the identification information for identifying download completion, the optical recording and/or reproducing apparatus 10 controls download completion (which corresponds to the above-described third control information), and such identification information is referred to as a "download flag". Herein, a download flag "1", which indicates download completion, is assigned to each of the completely downloaded remote files 33333.mpls, 03000.clpi, and 03000.m2ts. Alternatively, a download flag "0" is assigned to each of the non-downloaded remote files 02000.clpi and 02000.m2ts, so as to indicate download incompletion. Therefore, the system within the optical recording and/or reproducing apparatus 10 can easily recognize the type of additional data that are presently downloaded.

FIG. 5B illustrates a method of playing-back a file by using the downloaded additional data. For example, a PlayList file 33333.mpls, which is an initial remote file, becomes accessible only after downloading a new 33333.mpls file from an external source. And, a final reproduction is controlled by playing-back and controlling the original clip file (01000.clpi and 01000.m2ts) recorded within the optical disc and the downloaded additional clip file (03000.clpi and 03000.m2ts) by using the PlayItem. Therefore, in the first embodiment of the present invention, the optical recording and/or reproducing apparatus 10 stores the original file system included in the remote file recorded within the optical disc and the additional data downloaded by using the download list in a memory (numeral 15 of FIG. 11), and thus, a final file control can be performed by using the download flag.

Figure 6B:
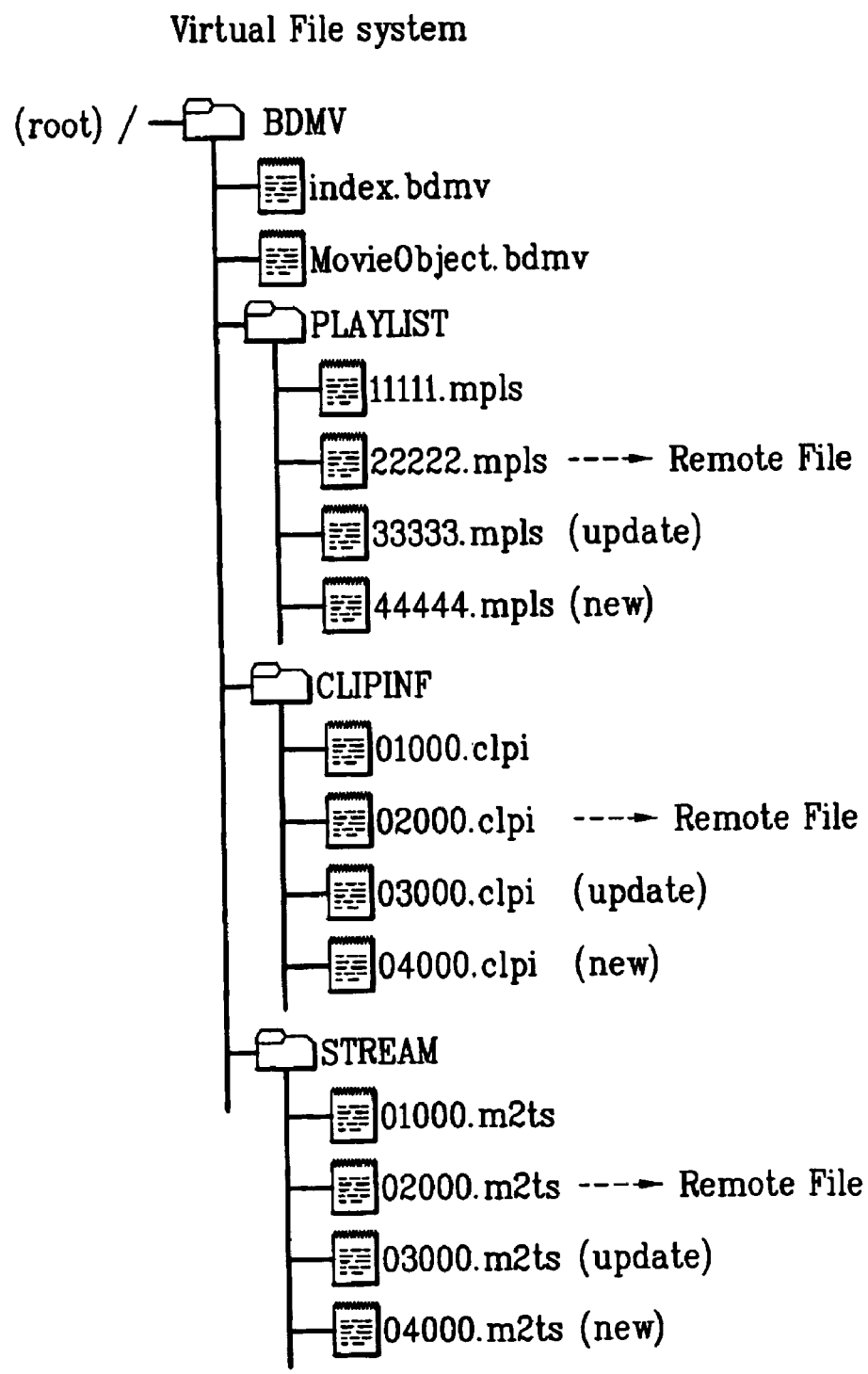

FIGS. 6A to 6C illustrate a method of controlling and playing-back a file according to a second embodiment of the present invention. More specifically, FIGS. 6A to 6C illustrate a method of controlling a file when an optical disc including an original file system, as shown in FIG. 4A, is loaded in an optical recording and/or reproducing apparatus 10. In addition, in the first embodiment of the present invention, the remote file included in the original file system, the additional data designated by the download list, and, also, non-designated additional data can all be downloaded, which is the difference between the first and second embodiments according to the present invention.

Accordingly, FIG. 6A illustrates an overall file control method, FIG. 6B illustrates a virtual file system created by using the newly downloaded additional data and control information. And, FIG. 6C illustrates a method of reproducing an optical disc by using the virtual file system. When the optical disc is loaded in the optical recording and/or reproducing apparatus 10, a file structure is identified from the file system information. Then, remote files and normal files are distinguished and identified, and in case of the remote files, a download list is verified. Subsequently, additional data is/are downloaded in accordance with a user demand or a system command. FIG. 6A illustrates an example in which, among the remote files, 33333.mpls, 03000.clpi, and 03000.m2ts are completely downloaded, and 02000.clpi and 02000.m2ts are not yet downloaded. And, furthermore, new files 44444.mpls, 04000.clpi, and 04000.m2ts are downloaded.

Therefore, by using the identification information for identifying download completion, the optical recording and reproducing apparatus 10 controls download completion. Herein, a download flag "1", which indicates download completion, is assigned to each of the completely downloaded remote files 33333.mpls, 03000.clpi, and 03000.m2ts. Alternatively, a download flag "0" is assigned to each of the non-downloaded remote files 02000.clpi and 02000.m2ts, so as to indicate download incompletion. Furthermore, although newly downloaded files are not included in the original file system, a download flag "1" is assigned to each of the newly downloaded files 44444.mpls, 04000.clpi, and 04000.m2ts.

FIG. 6B illustrates a newly created virtual file system. In order to download and use files that are not designated by the original file system, the second embodiment of the present invention reads the original file system, when the optical disc is loaded. Then, when a specific additional data is downloaded, a virtual file system for controlling both of the corresponding original file system and the downloaded additional file is created. For example, as compared to the original file system, in the newly created virtual file system (shown in FIG. 6B), 33333.mpls, 03000.clpi, and 03000.m2ts files are updated, 44444.mpls, 04000.clpi, and 04000.m2ts files are newly created, and 22222.mpls, 02000.clpi, and 02000.m2ts files are remained as remote files.

FIG. 6C illustrates a method of playing-back a file by using the virtual file system according to the present invention. For example, a PlayList file 33333.mpls, which is an initial remote file, becomes accessible only after downloading a new 33333.mpls file from an external source. And, a final reproduction is controlled by playing-back and controlling the original clip file (01000.clpi and 01000.m2ts) recorded within the optical disc and the downloaded additional clip file (03000.clpi and 03000.m2ts) by using the PlayItem. Furthermore, although PlayList file 44444.mpls is not included in the initial original file system, the PlayList file 44444.mpls is created after being newly downloaded from an external source. The newly created PlayList file 44444.mpls playsback and controls the downloaded additional clip files (04000.clpi and 04000.m2ts) by using the PlayItem.

Figure 11:
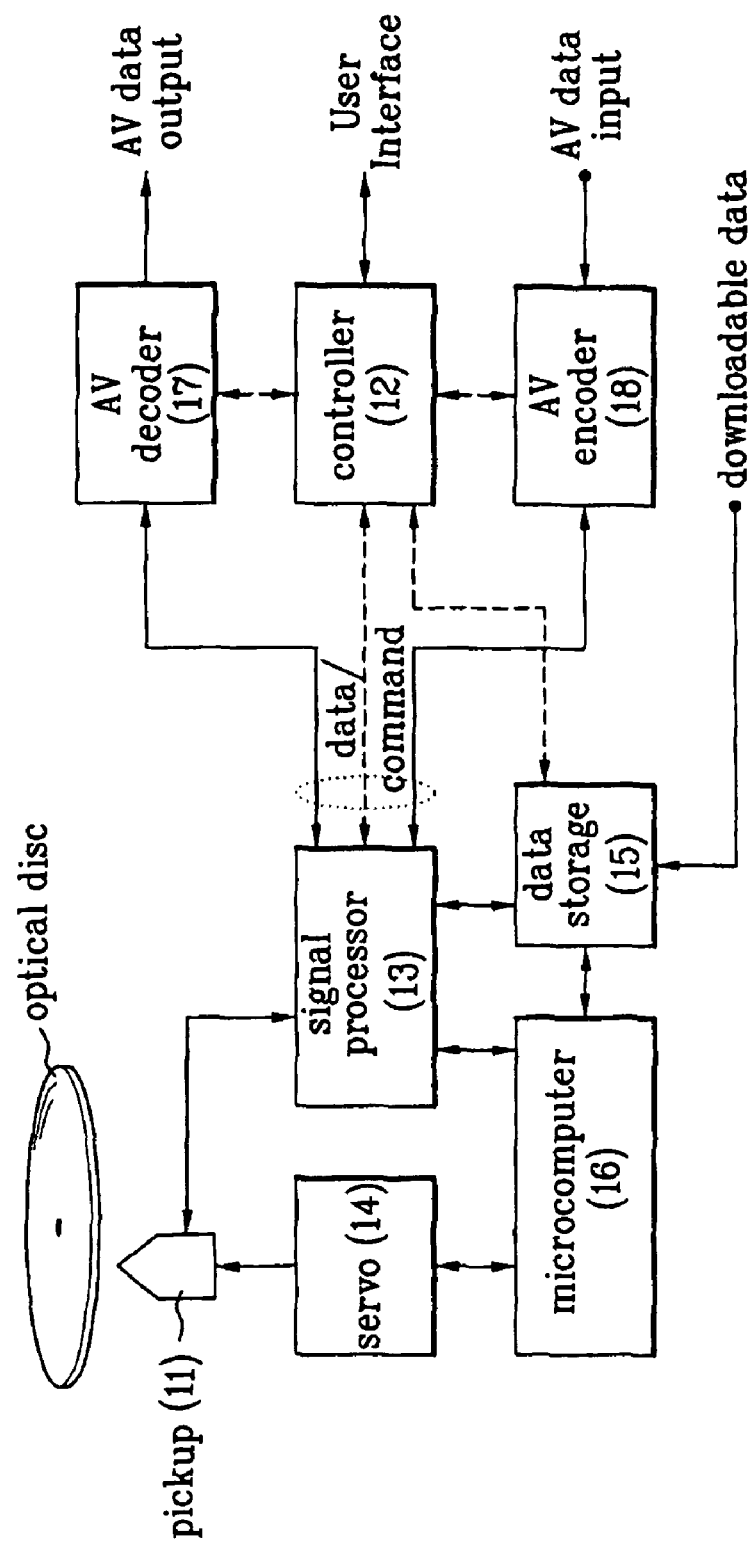
FIG. 11 illustrates an optical recording and/or reproducing apparatus according to the present invention.

Therefore, in the first embodiment of the present invention, the optical recording and/or reproducing apparatus 10 stores the original file system included in the remote file recorded within the optical disc and the additional data downloaded by using the download list in a memory (numeral 15 of FIG. 11). Thereafter, each time an additional data is newly downloaded, the virtual file system and the download flag may be updated, so as to perform file control.

Figure 7A:
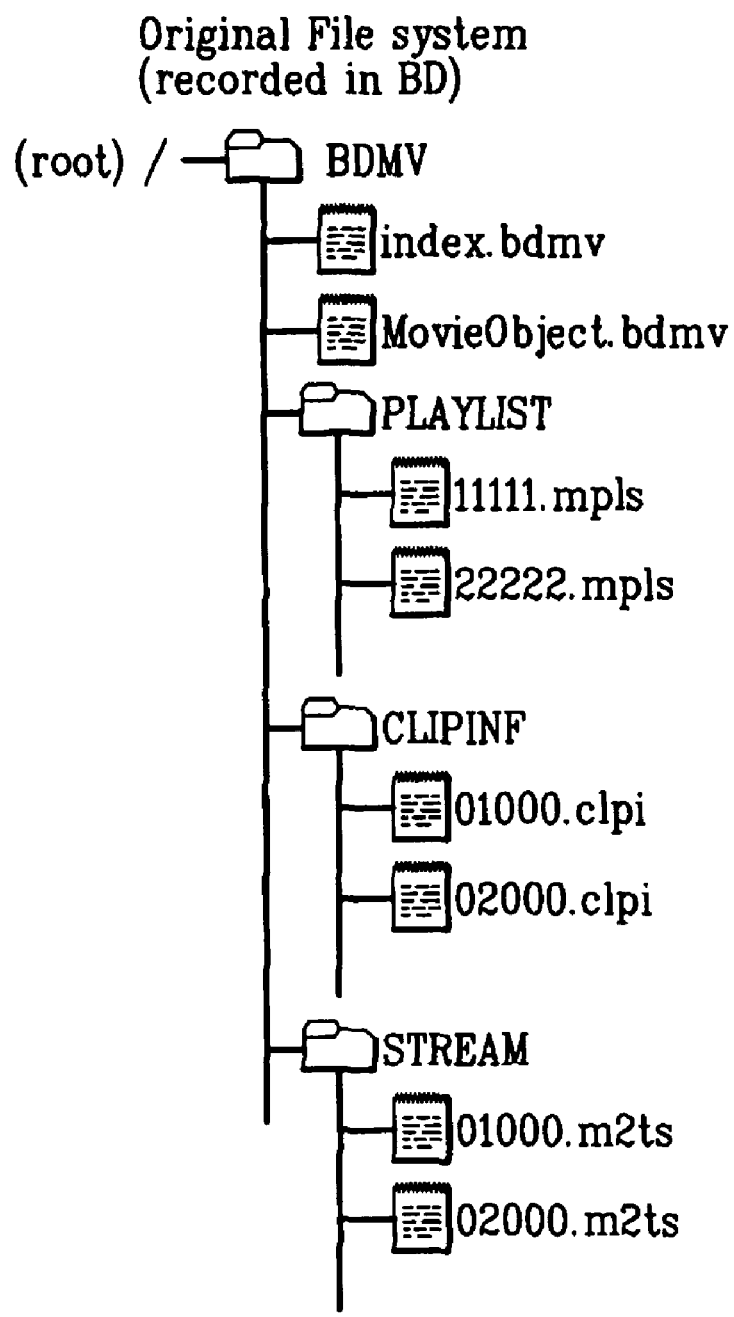
FIGS. 7A and 7B illustrate an example of an original file system including a normal file only.
Figure 7B:
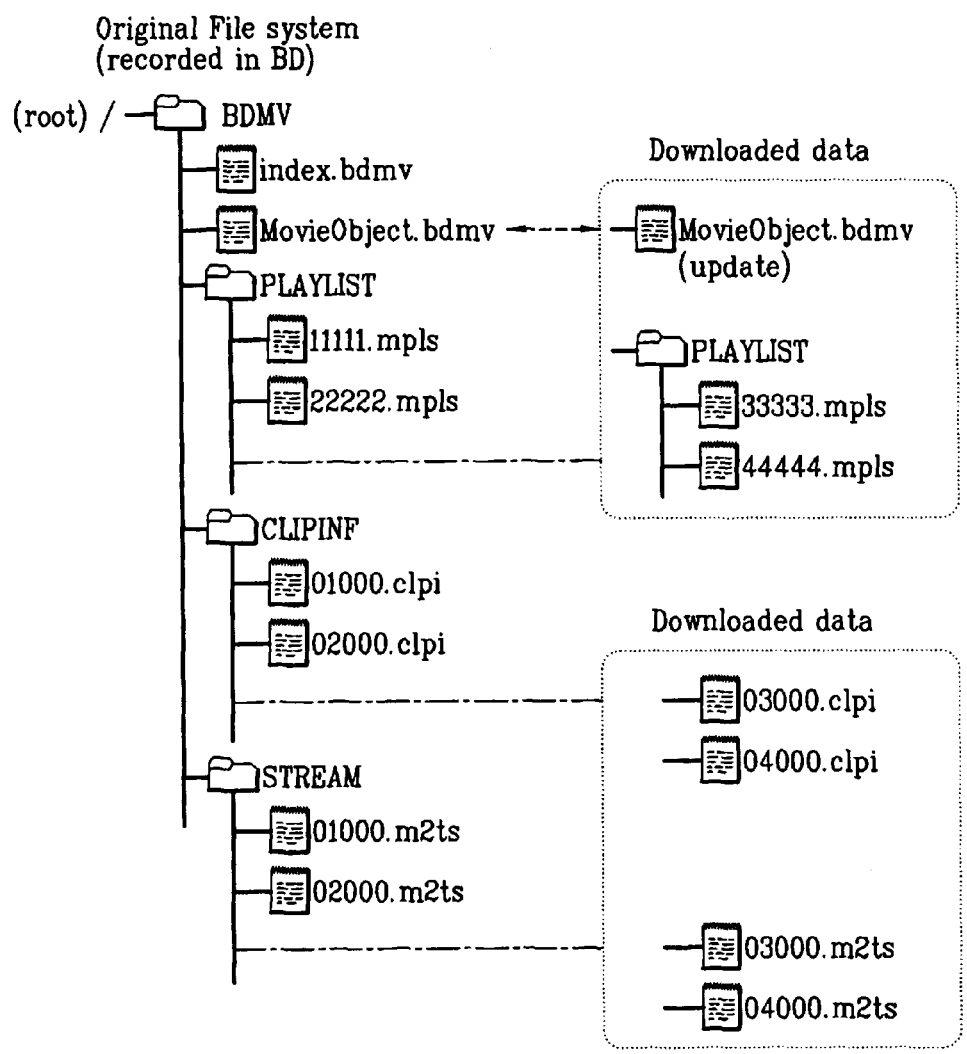

FIGS. 7A and 7B illustrate a file system structure of an optical disc according to the present invention, which is an example of an original file system including a normal file only. More specifically, as compared to the above-described example shown in FIG. 4A, a remote file is not included in the original file system, and thus, a download list is also not included in the file system. Therefore, the user can easily and freely download a desired additional data regardless of the original file system. FIG. 7A illustrates a file structure that is controlled by an original file system. The original file structure is identical to the original file structure shown in FIG. 2, except for that the files are all normal files.

FIG. 7B illustrates an example of an additional data downloaded in accordance with a user demand or a system command. Referring to FIG. 7B, the downloaded files include MovieObject.bdmv, 33333.mpls, 44444.mpls, 03000.clpi, 03000.m2ts, 04000.clpi, and 04000.m2ts files. Herein, although MovieObject.bmdv already exists within the initial original file system, the MovieObject.bmdv is information newly downloaded in order to be updated. However, the rest of the files are new files that are not included in the initial original file system.

More specifically, the MovieObject.bmdv included in the initial original file system is a normal file, which can be accessed by itself. However, a new MovieObject.bmdv file may be downloaded for updating purposes whenever required. Such principle may be equally applied to the other normal files. Thus, as a general file, the MovieObject.bmdv file consists of a group of commands for playing-back a PlayList and may be named as a "JavaObject" file depending upon the adopted embodiment.

Figure 8:
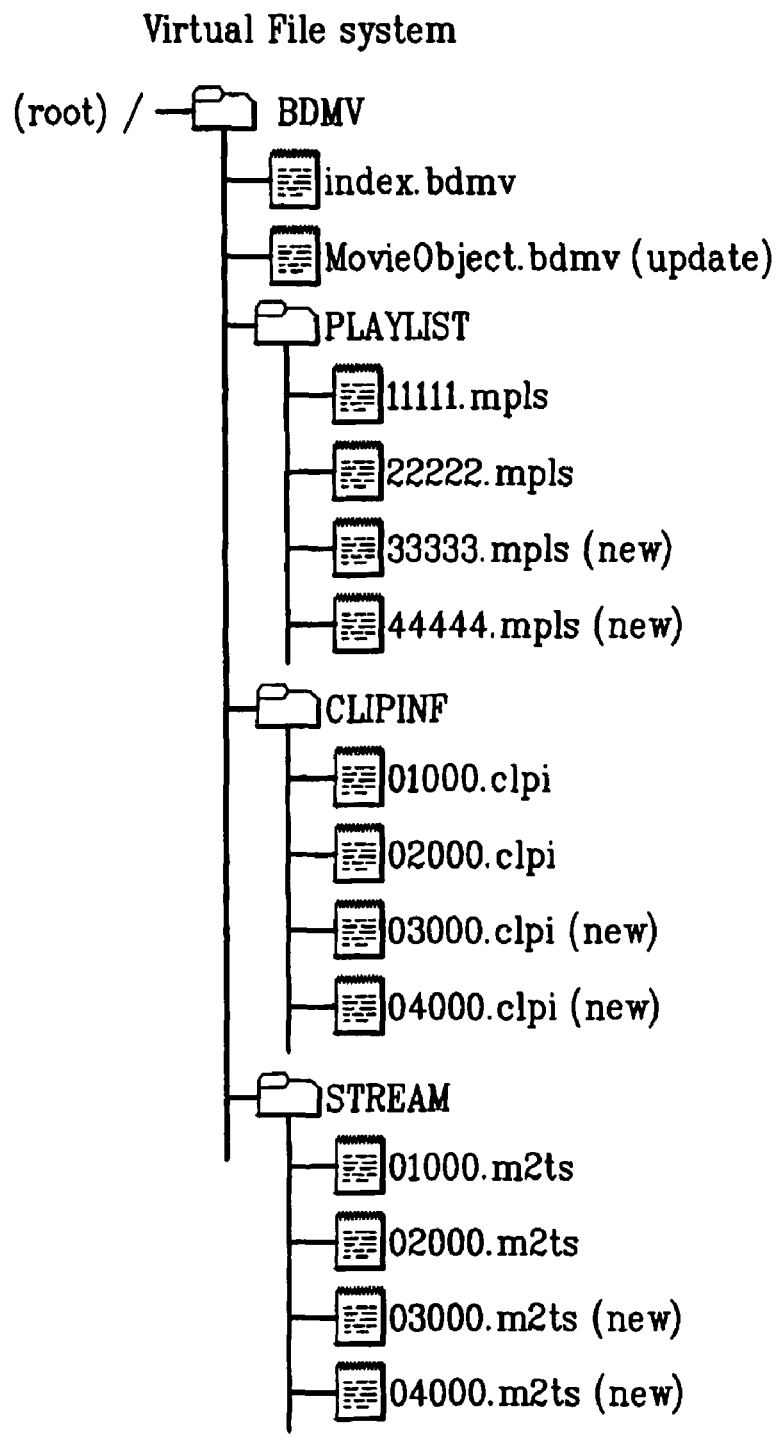
FIG. 8 illustrates a method of controlling and playing-back a file according to a third embodiment of the present invention.

FIG. 8 illustrates a method of controlling and playing-back a file according to a third embodiment of the present invention. More specifically, FIG. 8 illustrates a method of controlling a file when an optical disc including and original file system, as shown in FIG. 7A, is loaded in the optical recording and/or reproducing apparatus 10. Furthermore, FIG. 8 illustrates an example of controlling a file by creating a virtual file system by binding the downloaded additional data and the original file system. Therefore, in the third embodiment of the present invention, the optical recording and/or reproducing apparatus 10 stores an original file system including only normal files, which is recorded within an optical disc, in a memory (numeral 15 of FIG. 11). Then, a virtual file system is created and updated whenever an additional data is newly downloaded, so as to control the files.

Figure 9:
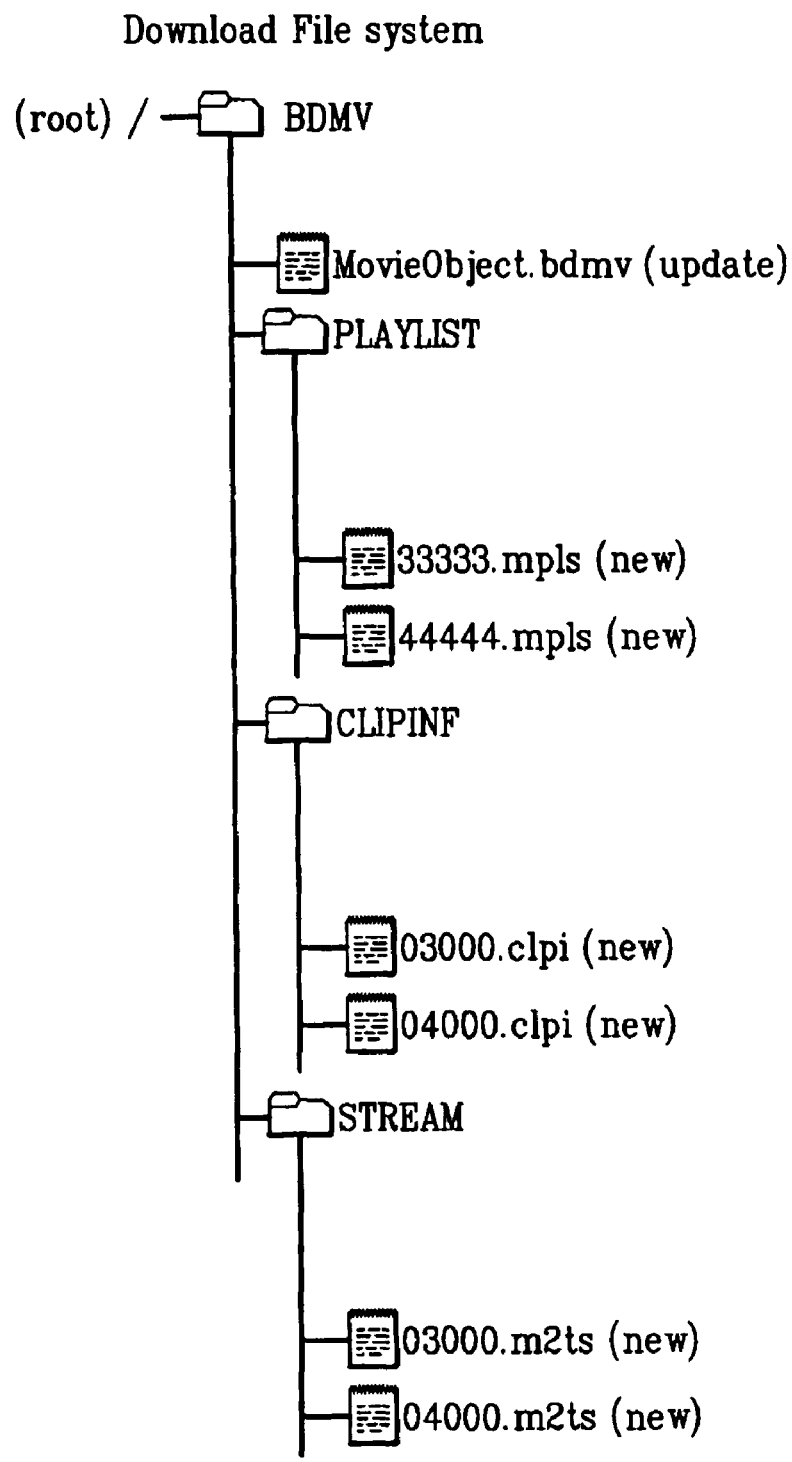
FIG. 9 illustrates a method of controlling and playing-back a file according to a fourth embodiment of the present invention.

FIG. 9 illustrates a method of controlling a file within a high-density optical disc according to a fourth embodiment of the present invention. More specifically, FIG. 9 illustrates an example of created a download file system with downloaded additional data only, and controlling the files in along with the above-described original file system recorded within the optical disc. Therefore, in the fourth embodiment of the present invention, the optical recording and/or reproducing apparatus 10 stores only the download file system consisting of the downloaded additional data. Then, the download file system is updated each time an additional data is downloaded. And, file control of the download file system may be performed in combination with the original file system recorded within the optical disc whenever required. Accordingly, in the fourth embodiment, the download file system and the original file system may be bound together, and the above-described virtual file system may be used to control the bound file system as a single file system.

Figure 10:
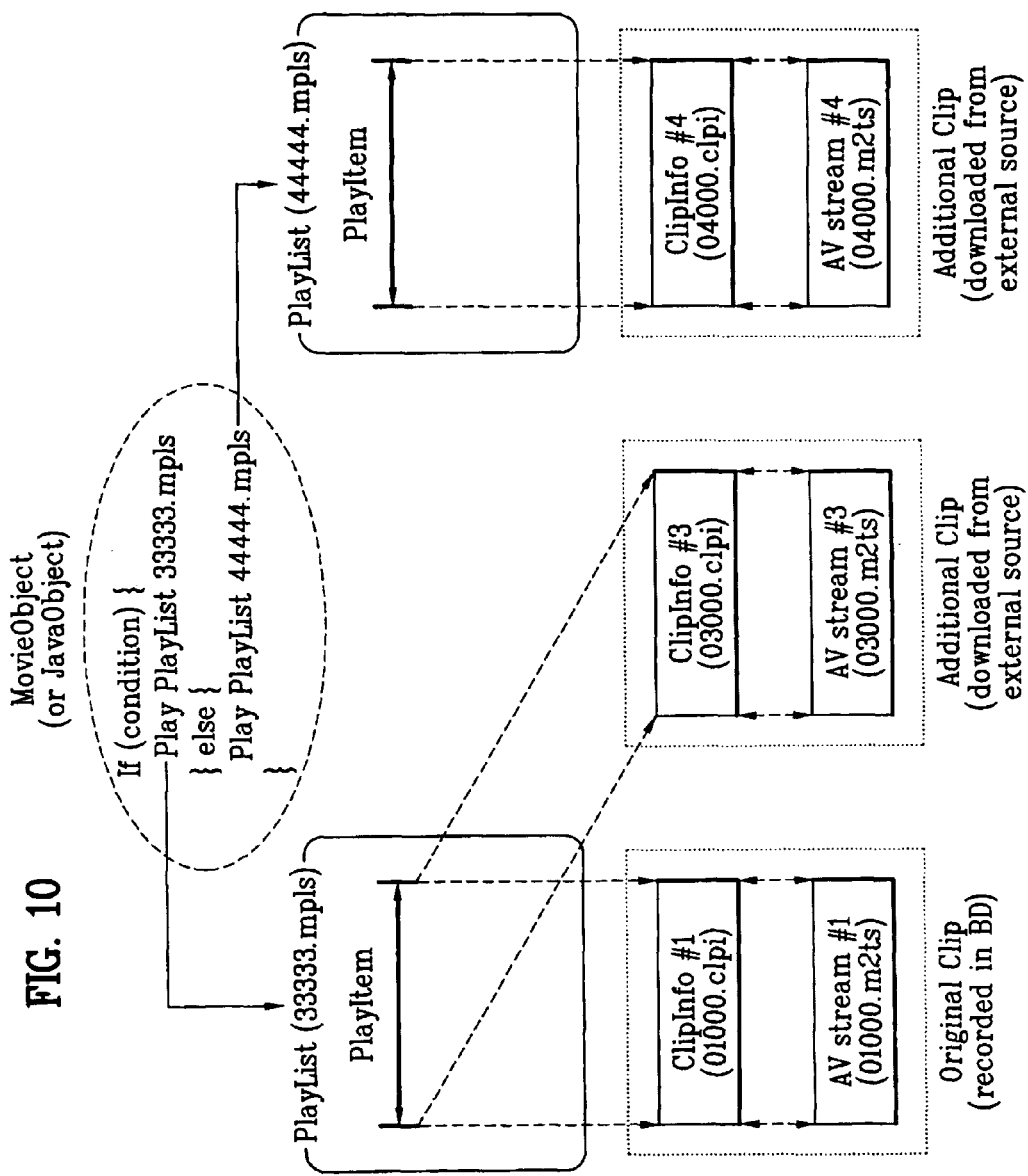
FIG. 10 illustrates an example of playing-back a file according to the third and fourth embodiments of the present invention.

FIG. 10 illustrates a method of playing-back a file by using one of a virtual file system (shown in FIG. 8) and a download file system (shown in FIG. 9), which is stored in the memory, according to the third and fourth embodiments of the present invention. Foe example, PlayList files 33333.mpls and 44444.mpls are not included in the initial original file system. However, the PlayList files 33333.mpls and 44444.mpls have become accessible after being newly downloaded from the external source.

More specifically, PlayList file 33333.mpls plays-back and controls the original clip files (01000.clpi and 01000.m2ts) recorded within the optical disc and the downloaded additional clip files (03000.clpi and 03000.m2ts) by using a PlayItem. Also, the PlayList file 44444.mpls plays-back and controls the downloaded additional clip files (04000.clpi and 04000.m2ts) by using a PlayItem. Furthermore, in order to play-back and control the downloaded PlayList files 33333.mpls and 44444.mpls, the newly downloaded MovieObject.bmdv file includes a command playing-back the 33333.mpls file under a specific condition and playing-back the 44444.mpls file under another specific condition.

FIG. 11 illustrates a detailed view of an optical recording and/or reproducing apparatus 10 according to the present invention, which plays-back and controls a file within a high density optical disc. The optical recording and/or reproducing apparatus 10 basically includes a pick-up unit 11 for reproducing file information including the original data and the original file system recorded on the optical disc, a servo 14 controlling the operations of the pick-up unit 11, a signal processor 13 either recovering the playback signal received from the pick-up unit 11 to a desired signal value, or modulating a signal to be recorded to an optical disc recordable signal and transmitting the modulated signal, and a microcomputer 16 controlling the above operations.

In addition, an AV decoder 17 performs final decoding of output data (i.e., the original data and/or the additional data) depending upon the controls of the controller 12. And, in order to perform the function of recording a signal on the optical disc, an AV encoder 18 converts an input signal into a signal of a specific format (e.g., an MPEG-2 transport stream) depending upon the controls of the controller 12 and, then, provides the converted signal to the signal processor 13.

A controller 12 controls all operation of the optical recording and/or reproducing apparatus 10 according to the present invention. More specifically, in case of the first embodiment (shown in FIG. 5A) of the present invention, the controller 12 reads a remote file from an original file system recorded within optical disc. Then, the controller 12 downloads an additional data, which is associated with the read remote file, from an external source and stores the downloaded additional data in a memory. Finally, by controlling the data to be reproduced, which is decoded from the AV decoder, the controller 12 may control a desired file and control reproduction.

Alternatively, in case of the second embodiment (shown in FIG. 6A) and the third embodiment (shown in FIG. 8) of the present invention, the controller 12 downloads an additional data from an external source and file information controlling the additional data. The controller 12 then binds together the downloaded file information and an original file system recorded within the optical disc, thereby creating a virtual file system. Finally, by using the file information included in the newly created virtual file system, so as to control the data to be reproduced, which is decoded from the AV decoder, the controller 12 may control a desired file and control reproduction.

Furthermore, in case of the fourth embodiment (shown in FIG. 9), the controller 12 downloads an additional data from an external source and file information controlling the additional data. Then, the controller 12 uses the downloaded file information, so as to create a download file system, and stores the newly created download file system in the memory. Finally, by using the file information included in any one of the stored download file system and the original file system recorded within the optical disc, so as to control the data to be reproduced, which is decoded from the AV decoder, the controller 12 may control a desired file and control reproduction.

At this point, it is obvious that a virtual file system is separately created by binding the download file system and the original file system together. Accordingly, the memory 15 storing the additional data as well as one of the virtual file system and the download file system may continuously use the stored data in later processes, or the memory 15 may use a dynamic memory for temporarily storing data.

As described above, the recording medium, the method of controlling a file of the recording medium, and the method and apparatus for reproducing the same have the following advantages. Original data recorded within an optical disc and additional data downloaded from an external source can be used in combination, thereby enhancing product efficiency and facilitating the user's use of the product.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of reproducing data recorded on an optical disc, the method comprising:

reading an original file system recorded on the optical disc, the original file system including a normal file having actual data recorded on the optical disc and a remote files designating an additional data files downloadable from an external source, the remote file accessible after downloading the additional data from an external source;

distinguishing the normal file and the remote file based on attribute information of the normal file and the remote file;

reading a download list of the remote file recorded on the optical disc, the download list identifying an additional data files required to be downloaded from the external source;

downloading the additional data file from the external source based on the download list;

creating download status information indicating whether the additional data file has been completely downloaded;

downloading at least one new data file from the external source, each new data file being unidentified by the download list; and creating a virtual File system based on the original file system and file information of the at least one new data file, the virtual file system including the at least one new data file downloaded from the external source, wherein the created virtual file system is used to reproduce data recorded on the optical disc and data downloaded from the external source.

2. The method of claim 1, further comprising: storing the virtual file system in a local data storage.

3. The method of claim 1, further comprising:

updating the virtual file system when at least one of the undownloaded additional data files is downloaded from the external source.

4. A method of creating a virtual file system for an optical disc, the method comprising:

reading an original file system recorded on the optical disc, the original file system including a normal file having actual data recorded on the optical disc a remote file designating an additional data file downloadable from an external source, the remote file accessible after downloading the additional data from an external source;

distinguishing the normal file and the remote file based on attribute information of the normal file and the remote file;

reading a download list of the remote file recorded on the optical disc, the download list identifying an additional data file required to be downloaded from the external source;

downloading the additional data file from an external source based on the download list;

creating download status information indicating whether the additional data file has been completely downloaded; and creating a virtual file system based on the original file system and file information of the additional data file, wherein the virtual file system is used to reproduce the normal data files and the additional data file.

5. The method of claim 4, wherein the file information is downloaded from the external source.

6. The method of claim 4, wherein the file information is initially stored in a local data storage before the at least one additional data file is downloaded.

7. An apparatus of reproducing data recorded on an optical disc, the apparatus comprising:

a reproducing device configured to read data from the optical disc;

a local data storage configured to store the additional data file downloaded from an external source;

a controller configured to, control the reproducing device to read an original file system recorded on the optical disc, the original file system including a normal file having actual data recorded on the optical disc a remote file designating an additional data file downloadable from an external source, the remote file accessible after downloading the additional data from an external source, distinguish the normal file and the remote file based on attribute information of the normal file and the remote file, control the reproducing device to read a download list of the remote file recorded on the optical disc, the download list identifying an additional data file required to be downloaded from the external source, download the at least one additional data file based on the download list, create a virtual file system based on the original file system and file information of the additional data file, and reproduce wherein the normal original data files and the additional data file individually or in combination using the virtual file system.

8. The apparatus of claim 7, wherein the file information is downloaded from the external source.

9. The apparatus of claim 7, wherein the file information is initially stored in a local data storage before the at least one additional data file is downloaded.

10. The method of claim 1, wherein the download list indicates the file name of the additional data file.

11. The method of claim 1, wherein the download list indicates the resource locator information of the additional data file.

12. The method of claim 4, wherein the download list indicates the file name of the additional data file.

13. The method of claim 4, wherein the download list indicates the resource locator information of the additional data file.

14. The apparatus of claim 7, wherein the download list indicates the file name of the additional data file.

15. The apparatus of claim 7, wherein the download list indicates the resource locator information of the additional data file.

* * * * *